(12) United States Patent
Hoshino et al.

(10) Patent No.: US 10,051,237 B2
(45) Date of Patent: Aug. 14, 2018

(54) CONFERENCE SUPPORT APPARATUS, CONFERENCE SUPPORT SYSTEM, CONFERENCE SUPPORT METHOD, AND COMPUTER-READABLE RECORDING MEDIUM STORING CONFERENCE SUPPORT PROGRAM

(71) Applicant: Konica Minolta, Inc., Chiyoda-ku, Tokyo (JP)

(72) Inventors: Noriko Hoshino, Tokyo (JP); Shinya Ogino, Tokyo (JP); Shunsuke Takamura, Tokyo (JP); Kazuma Takeuchi, Tokyo (JP); Ikuko Tsubotani, Tokyo (JP); Kagumi Moriwaki, Hyogo (JP); Yoichi Kawabuchi, Hyogo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 67 days.

(21) Appl. No.: 14/971,317

(22) Filed: Dec. 16, 2015

(65) Prior Publication Data
US 2016/0170571 A1    Jun. 16, 2016

(30) Foreign Application Priority Data
Dec. 16, 2014    (JP) .................................. 2014-254272

(51) Int. Cl.
*H04N 7/14*       (2006.01)
*H04N 7/15*       (2006.01)
(Continued)

(52) U.S. Cl.
CPC ......... *H04N 7/155* (2013.01); *H04L 12/1813* (2013.01); *H04L 12/1822* (2013.01); *H04L 12/1827* (2013.01); *H04M 3/567* (2013.01)

(58) Field of Classification Search
CPC combination set(s) only.
See application file for complete search history.

(56) References Cited

U.S. PATENT DOCUMENTS

2004/0125124 A1* 7/2004 Kim ................... G06F 17/30799
                                                        715/716
2005/0226530 A1* 10/2005 Murayama .............. G06T 11/60
                                                        382/276
(Continued)

FOREIGN PATENT DOCUMENTS

JP       2003-339033        11/2003
JP       2010-176216         8/2010

*Primary Examiner* — Duc Nguyen
*Assistant Examiner* — Assad Mohammed
(74) *Attorney, Agent, or Firm* — Buchanan Ingersoll & Rooney PC

(57) ABSTRACT

A conference support apparatus includes: a conference management section that stores screen information obtained by the object operation to manage screen transition in the conference; a branch management section that stores branch information for discriminating a branch point in association with the screen on which a branching operation is performed to manage a branch point of the conference when the branching operation is performed to branch the discussion; and a digest creation section that refers to branch information to specify the digest part that connects the start point and the end point from which a branch is excluded when the branch is included between the start point and the end point and extracts screen information about a screen included in the specified digest part to create a conference digest on the basis of the screen information corresponding to the specified digest part when a digest creation operation is performed.

18 Claims, 17 Drawing Sheets

(51) Int. Cl.
*H04L 12/18* (2006.01)
*H04M 3/56* (2006.01)

(56) References Cited

U.S. PATENT DOCUMENTS

| | | | |
|---|---|---|---|
| 2008/0046809 A1 | 2/2008 | Oshima et al. | |
| 2008/0133563 A1* | 6/2008 | Hironiwa | G06F 8/51 |
| 2010/0023984 A1* | 1/2010 | Davi | H04N 7/17318 |
| | | | 725/110 |
| 2010/0053302 A1* | 3/2010 | Ivashin | H04L 12/1831 |
| | | | 348/14.08 |
| 2013/0275151 A1* | 10/2013 | Moore | G06Q 10/10 |
| | | | 705/3 |
| 2014/0115441 A1* | 4/2014 | Badoiu | G06F 17/3082 |
| | | | 715/230 |
| 2014/0198173 A1* | 7/2014 | Willig | H04N 7/15 |
| | | | 348/14.03 |
| 2014/0232817 A1* | 8/2014 | Jones | H04M 3/568 |
| | | | 348/14.08 |

* cited by examiner

OBJECT INFORMATION TABLE

| ID | OPERATION CONTENT | OPERATION TIME | META INFORMATION |
|---|---|---|---|
| OB1 | CREATION | 14:00:00 | ..... |
| | MOVEMENT | 14:00:30 | ..... |
| | RESIZING | 14:00:50 | ..... |
| | GROUPING | 14:02:00 | ..... |
| | ..... | ..... | ..... |
| OB2 | CREATION | 14:00:05 | ..... |
| | EDITING | 14:00:20 | ..... |
| | MOVEMENT | 14:00:45 | ..... |
| | GROUPING | 14:02:00 | ..... |
| | ..... | ..... | ..... |
| OB3 | CREATION | 14:00:30 | ..... |
| | EDITING | 14:00:50 | ..... |
| | GROUPING | 14:05:00 | ..... |
| | ..... | ..... | ..... |
| ..... | ..... | ..... | ..... |
| GR1 (COMPOSED OF OBJECTS A AND B) | GROUPING | 14:02:00 | ..... |
| | MOVEMENT | 14:02:10 | ..... |
| | RESIZING | 14:02:20 | ..... |
| | ..... | ..... | ..... |
| ..... | ..... | ..... | ..... |

FIG. 4

SCREEN TRANSITION INFORMATION TABLE

| SCREEN ID | TIME | COMPOSING OBJECT | BRANCH INFORMATION |
|---|---|---|---|
| SCREEN 0 | 14:00:00 | ..... | B000 |
| ..... | ..... | ..... | — |
| SCREEN 1 | 14:10:00 | OB1,OB2,GR1 | — |
| ..... | ..... | ..... | — |
| SCREEN 2 | 14:20:00 | ..... | — |
| ..... | ..... | ..... | — |
| SCREEN 3 | 14:30:00 | ..... | — |

*FIG. 5*

SCREEN TRANSITION INFORMATION TABLE

| SCREEN ID | TIME | COMPOSING OBJECT | BRANCH INFORMATION |
|---|---|---|---|
| SCREEN 0 | 14:00:00 | ..... | B000 |
| ..... | ..... | ..... | — |
| SCREEN 1 | 14:10:00 | OB1,OB2,GR1 | B002 |
| ..... | ..... | ..... | — |
| SCREEN 2 | 14:20:00 | ..... | B001 |
| ..... | ..... | ..... | — |
| SCREEN 3 | 14:30:00 | ..... | — |
| SCREEN 2 | 14:40:00 | ..... | B001 |
| ..... | ..... | ..... | — |
| SCREEN 4 | 14:50:00 | ..... | — |
| SCREEN 1 | 15:00:00 | OB1,OB2,GR1 | B002 |
| ..... | ..... | ..... | — |
| SCREEN 5 | 15:10:00 | ..... | B003 |
| ..... | ..... | ..... | — |
| SCREEN 6 | 15:20:00 | ..... | — |
| SCREEN 5 | 15:30:00 | ..... | B003 |
| ..... | ..... | ..... | — |
| SCREEN 7 | 15:40:00 | ..... | — |

FIG. 6

SCREEN TRANSITION INFORMATION TABLE

| SCREEN ID | TIME | COMPOSING OBJECT | BRANCH INFORMATION | |
|---|---|---|---|---|
| SCREEN 0 | 14:00:00 | ..... | B000 | |
| ..... | ..... | ..... | — | |
| SCREEN 1 | 14:10:00 | OB1,OB2,GR1 | — | |
| ..... | ..... | ..... | — | |
| SCREEN 2 | 14:20:00 | ..... | B001 | ← SCREEN INFORMATION RECORDED FIRST |
| ..... | ..... | ..... | — | |
| SCREEN 3 | 14:30:00 | ..... | — | |
| SCREEN 2 | 14:40:00 | ..... | B001 | ← SCREEN INFORMATION RECORDED NEXT |
| ..... | ..... | ..... | — | |

*FIG. 11*

SCREEN TRANSITION INFORMATION TABLE

| SCREEN ID | TIME | COMPOSING OBJECT | BRANCH INFORMATION |
|---|---|---|---|
| SCREEN 0 | 14:00:00 | ..... | B000 |
| ..... | ..... | ..... | — |
| SCREEN 1 | 14:10:00 | OB1,OB2,GR1 | B002 |
| SCREEN 2 | 14:20:00 | ..... | B001 |
| ..... | ..... | ..... | — |
| SCREEN 3 | 14:30:00 | ..... | — |
| SCREEN 2 | 14:40:00 | ..... | B001 |
| ..... | ..... | ..... | — |
| SCREEN 4 | 14:50:00 | ..... | — |
| SCREEN 1 | 15:00:00 | OB1,OB2,GR1 | B002 |
| ..... | ..... | ..... | — |
| SCREEN 5 | 15:10:00 | ..... | B003 |
| ..... | ..... | ..... | — |
| SCREEN 6 | 15:20:00 | ..... | — |
| SCREEN 5 | 15:30:00 | ..... | B003 |
| ..... | ..... | ..... | — |
| SCREEN 7 | 15:40:00 | ..... | — |

DIGEST TARGET

SCREEN TRANSITION INFORMATION TABLE

| SCREEN ID | TIME | COMPOSING OBJECT | BRANCH INFORMATION |
|---|---|---|---|
| SCREEN 0 | 14:00:00 | ····· | B000 |
| ····· | ····· | ····· | — |
| SCREEN 1 | 14:10:00 | OB1,OB2,GR1 | B002 |
| SCREEN 2 | 14:20:00 | ····· | B001 |
| ····· | ····· | ····· | — |
| SCREEN 3 | 14:30:00 | ····· | — |
| SCREEN 2 | 14:40:00 | ····· | B001 |
| ····· | ····· | ····· | — |
| SCREEN 4 | 14:50:00 | ····· | — |
| SCREEN 1 | 15:00:00 | OB1,OB2,GR1 | B002 |
| ····· | ····· | ····· | — |
| SCREEN 5 | 15:10:00 | ····· | B003 |
| ····· | ····· | ····· | — |
| SCREEN 6 | 15:20:00 | ····· | — |
| SCREEN 5 | 15:30:00 | ····· | B003 |
| ····· | ····· | ····· | — |
| SCREEN 7 | 15:40:00 | ····· | — |

S2, E2

 DIGEST TARGET

*FIG. 22*

SCREEN TRANSITION INFORMATION TABLE

| SCREEN ID | TIME | COMPOSING OBJECT | BRANCH INFORMATION |
|---|---|---|---|
| SCREEN 0 | 14:00:00 | ..... | B000 |
| ..... | ..... | ..... | ..... |
| SCREEN 1 | 14:10:00 | OB1,OB2,GR1 | B002 |
| ..... | ..... | ..... | — |
| SCREEN 2 | 14:20:00 | ..... | B001 |
| ..... | ..... | ..... | — |
| SCREEN 3 | 14:30:00 | ..... | — |
| SCREEN 2 | 14:40:00 | ..... | B001 |
| ..... | ..... | ..... | — |
| SCREEN 4 | 14:50:00 | ..... | — |
| SCREEN 1 | 15:00:00 | OB1,OB2,GR1 | B002 |
| ..... | ..... | ..... | — |
| SCREEN 5 | 15:10:00 | ..... | B003 |
| ..... | ..... | ..... | — |
| SCREEN 6 | 15:20:00 | ..... | — |
| SCREEN 5 | 15:30:00 | ..... | B003 |
| SCREEN 7 | 15:40:00 | ..... | — |

DIGEST TARGET

CONFERENCE SUPPORT APPARATUS, CONFERENCE SUPPORT SYSTEM, CONFERENCE SUPPORT METHOD, AND COMPUTER-READABLE RECORDING MEDIUM STORING CONFERENCE SUPPORT PROGRAM

CROSS REFERENCE TO RELATED APPLICATIONS

The entire disclosure of Japanese Patent Application No. 2014-254272 filed on Dec. 16, 2014 including description, claims, drawings, and abstract are incorporated herein by reference in its entirety.

BACKGROUND OF THE INVENTION

1. Technological Field

The present invention relates to a conference support apparatus, a conference support system, a conference support method, and a computer-readable recording medium storing a conference support program.

2. Background

In recent years, conference support apparatuses have been proposed in which an electric blackboard provided with a touch panel and the like is used and screen transition in accordance with user operation is stored to manage the flow of the conference in a time-series manner (see, for example, Japanese Patent Application Laid-Open Nos. 2003-339033 and 2010-176216). Conference support apparatuses manage the flow of the conference in a time-series manner, and thus can reproduce the state of the screen at an arbitrary time point.

In the following description, a system in which a plurality of apparatuses including a conference support apparatus are connected through a network such as the Internet and wireless/cable LAN (Local Area Network) is referred to as conference support system. Each apparatus of a conference support system functions as a display section or an operation section. In the conference support system, by operating his or her terminal apparatus, the user can perform various object operations such as moving, expanding and contracting on various objects such as text boxes in which to input letters and marks, and diagrams. In addition, PTL 1 proposes to create the summary for each theme or speaker of a conference in order to efficiently grasp the flow of the conference.

3. Description of the Related art

As described above, while conference support systems have been utilized for the efficiency of the conference, it is necessary to branch the discussion by returning to an arbitrary time point for discussion from different viewpoints in some cases. For example, U.S. Patent Application Laid-Open No. 2008/0046809 discloses a document processing apparatus, not a conference support system, in which an undo UI screen for displaying a time axis and a slider is provided in a lower area on a screen and the time axis displayed on the undo UI screen can be branched. When a discussion that has reached a certain conclusion can be selectively reproduced as a digest from among conclusions obtained by discussions through the complicated processes including branches, the content of the conference can be efficiently shared or looked back, and thus the convenience of the conference support system is further improved. Unfortunately, conventional conference support systems have not been designed for such a function, and have a room for improvement in terms of convenience.

SUMMARY OF THE INVENTION

An object of the present invention is to provide a conference support apparatus, a conference support system, a conference support method, and a conference support program which can improve efficiency of a conference by utilizing a highly convenient conference digest.

To achieve the abovementioned object, a conference support apparatus reflecting one aspect of the present invention is adaptable for a conference support system including a display that displays an object and an operation acceptor that accepts an operation of an operator for the object displayed on the display and generates a first signal corresponding to the operation of the object accepted by the operation acceptor. The conference support apparatus includes: a controller that receives the first signal from the operation acceptor and transmits a second signal to the display; and a storage that stores, in a time-series manner, scene information relating to a scene produced in the operation of the object accepted by the operation acceptor, and stores branch information designating a branch point in association with a scene in which the operation acceptor accepts an operation of creating the branch point in a discussion represented with the scene information by setting the scene back to an arbitrary previous time point. The controller refers to information including the branch information stored in the storage when an operation for creating a conference digest including designation of a start point and an end point of the conference digest is accepted by the operation acceptor, specifies scene information corresponding to a period of the conference digest which is defined by the start point and the end point except for a residual path subsequent to the branch point, and creates the conference digest in accordance with the specified scene information.

A conference support system reflecting one aspect of the present invention includes: the conference support apparatus; and a terminal comprising at least one of the display and the operation acceptor, and communicatively connected to the conference support apparatus.

A conference support method reflecting one aspect of the present invention is adaptable for a conference support system including a display that displays an object and an operation acceptor that accepts an operation of an operator for the object displayed on the display and generates a first signal corresponding to the operation of the object accepted by the operation acceptor. The method includes: managing scene transition in a conference by storing, in a time-series manner, scene information in a storage, wherein the scene information relating to a scene produced in the operation of the object accepted by the operation acceptor; managing a branch point in the conference by storing branch information in the storage, wherein the branch information designates the branch point in association with a scene in which the operation acceptor accepts an operation of creating the branch point in a discussion represented with the scene information by setting the scene back to an arbitrary previous time point; and referring to information including the branch information stored in the storage when an operation for creating a conference digest including designation of a start point and an end point of the conference digest is accepted by the operation acceptor, specifying scene information corresponding to a period of the conference digest which is defined by the start point and the end point except for a residual path subsequent to the branch point, and creating the conference digest in accordance with the specified scene information.

A computer-readable recording medium reflecting one aspect of the present invention stores a conference support program configured to cause a computer of a conference support apparatus to execute processing, the computer being intended for use in a conference support system including a display that displays an object and an operation acceptor that accepts the operation of an operator for the object displayed on the display and generates a first signal corresponding to the operation of the object accepted by the operation acceptor. The processing includes: managing scene transition in a conference by storing, in a time-series manner, scene information in a storage, wherein the scene information relates to a scene produced in the operation of the object accepted by the operation acceptor; managing a branch point in the conference by storing branch information in the storage, wherein the branch information designates the branch point in association with a scene in which the operation acceptor accepts an operation of creating the branch point in a discussion represented with the scene information by setting the scene back to an arbitrary previous time point; and referring to information including the branch information stored in the storage when an operation for creating a conference digest including designation of a start point and an end point of the conference digest is accepted by the operation acceptor, specifying scene information corresponding to a period of the conference digest which is defined by the start point and the end point except for a residual path subsequent to the branch point, and creating the conference digest in accordance with the specified scene information.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 4 illustrates an exemplary object information table;

FIG. 5 illustrates an exemplary screen transition information table;

FIG. 6 illustrates another exemplary screen transition information table;

FIG. 11 illustrates an exemplary screen transition information table immediately after a branching operation;

FIG. 22 illustrates a transition table corresponding to the digest part screen of FIG. 19.

DESCRIPTION OF THE PREFERRED EMBODIMENTS

Hereinafter, an embodiment of the present invention will be described with reference to the accompanying drawings. However, the scope of the invention is not limited to the descriptions.

In the following, an embodiment of the present invention is described in detail with reference to the drawings.

Figure 1:
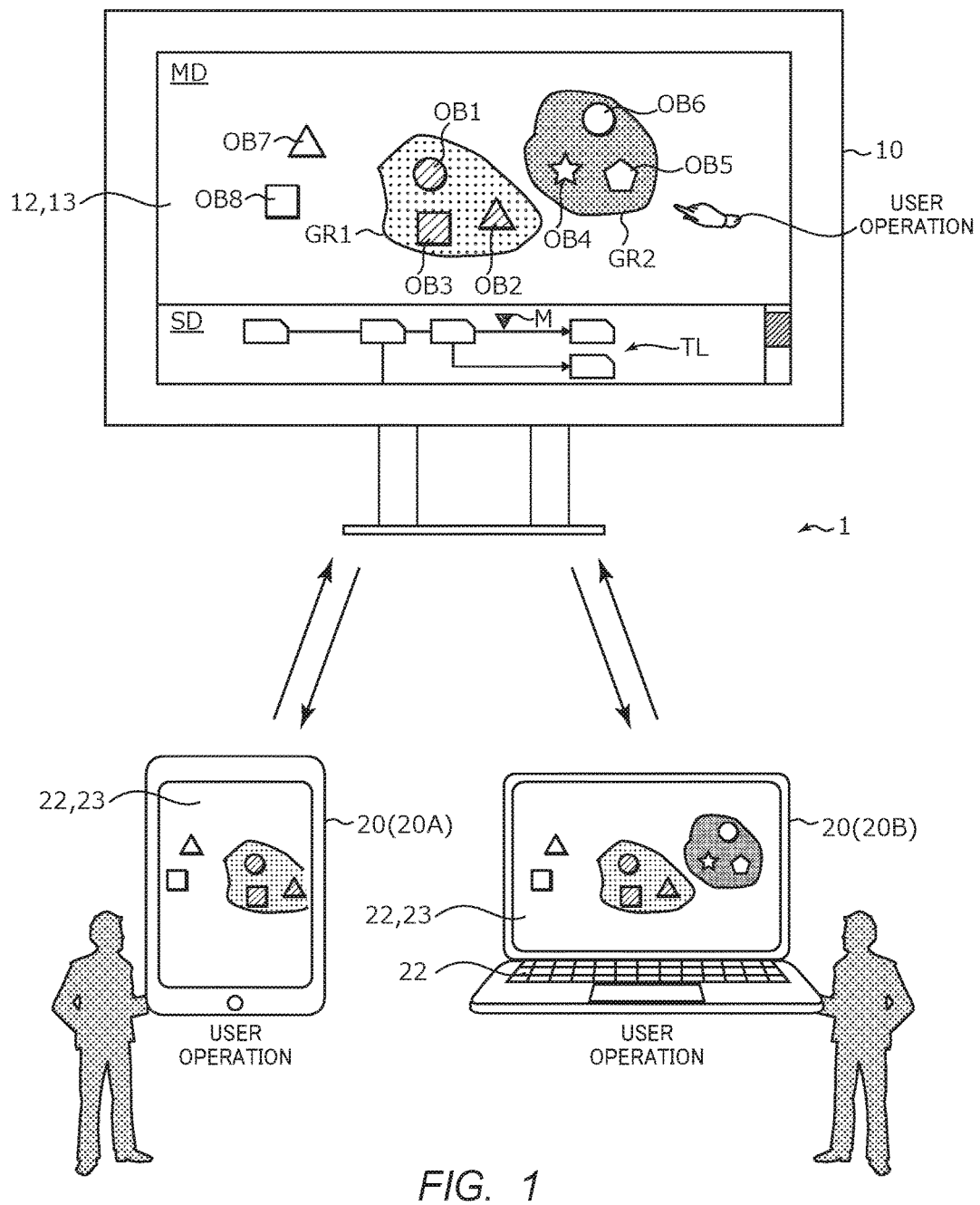
FIG. 1 illustrates a schematic configuration of a conference support system according to an embodiment of the present invention.

FIG. 1 illustrates a schematic configuration of conference support system 1 according to an embodiment of the present invention.

As illustrated in FIG. 1, conference support system 1 includes conference support apparatus 10 and terminal apparatus 20. Conference support apparatus 10 and terminal apparatus 20 are communicatively connected together through a network such as a cable/wireless LAN.

Conference support apparatus 10 is composed of an electronic whiteboard, a projector, a server apparatus, a personal computer, a mobile terminal (such as a smartphone, a tablet terminal and a notebook computer) and or like, for example. In the present embodiment, an exemplary case where an electronic whiteboard that functions as a display section and an operation section of conference support system 1 is adopted as conference support apparatus 10 is described. The display section includes a display that displays an object and the operation section includes an operation acceptor that accepts an operation of an operator for the object displayed on the display and generates a signal in relation with the operation. It is to be noted that the display section and the operation section of conference support system 1 may not be provided in conference support apparatus 10 as long as they are communicatively connected with conference support apparatus 10.

Terminal apparatus 20 is composed of a mobile terminal such as a smartphone, a tablet terminal, and a notebook computer, a desk top personal computer, or the like. Terminal apparatus 20 functions as the display section or the operation section of conference support system 1. As terminal apparatuses 20, FIG. 1 illustrates tablet terminal 20A and notebook computer 20B that function as the display section and the operation section of conference support system 1. It is to be noted that terminal apparatus 20 may be installed in the same conference room as conference support apparatus 10, or at a different place remote from conference support apparatus 10. In addition, the number of terminal apparatuses 20 is not limited.

Conference support apparatus 10 stores screen transition based on the user operation, and manages the flow of the conference in a time-series manner. Specifically, when a user adds objects of elements of the proceedings to the display region of display section 13 or operates displayed objects from operation section 12 or operation section 22 of conference support apparatus 10 or terminal apparatus 20 in a conference, information relating to the screen at this time (hereinafter referred to as "screen information") is stored. In addition, the screen displayed on display section 13 of conference support apparatus 10 is reflected on display section 23 of terminal apparatus 20.

Here, the object is data to be operated, and is displayed on display section 13 in the form of letters, marks, text boxes in which letters and marks are input, diagrams, photographic images, work areas (windows) of the application on display section 13, and the like. In the present embodiment, the object is displayed in the form of simple diagrams. In addition, operations of changing the state of objects such as adding (newly creating), moving, editing, resizing, deleting, grouping, ungrouping and the like of objects are referred to as "object operation." It is to be noted that the "grouping" is an operation of assigning a plurality of objects to one group. The objects thus grouped can be collectively moved, and can be simultaneously expanded and contracted.

In FIG. 1, display section 13 of conference support apparatus 10 is sectioned into main screen MD on which objects are displayed, and sub-screen SD on which a tree structure diagram (hereinafter referred to as "time line") for visually grasping the flow of the conference is displayed. It is possible to adopt a configuration in which main screen MD is normally displayed, and the sub-screen is displayed as necessary. In addition, sub-screen SD may be displayed on the entirety of the display region. Here, main screen MD and sub-screen SD are displayed at all times, and their sizes are changed in accordance with the user operation.

While the following description explains an exemplary case where main screen MD and sub-screen SD are mainly displayed on display section 13 of conference support apparatus 10 and operated by an operation on operation section 12 of conference support apparatus 10, it is also possible to adopt a configuration where at least one of main screen MD and sub-screen SD is displayed on display section 23 of terminal apparatus 20, or a configuration where main screen MD and sub-screen SD are operated from operation section 22 of terminal apparatus 20.

In FIG. 1, eight objects, OB1 to OB8, are created on main screen MD, and objects OB1 to OB3, and objects OB4 to OB6 are grouped into respective groups (GR1 and GR2). Time line TL of a case where the discussion is branched at an arbitrary time point is displayed on sub-screen SD. When the discussion is branched, multiple conclusions are obtained.

The user performs an object operation on main screen MD, and a time line operation on sub-screen SD. The time line operation refers to an operation that is performed utilizing time line TL, and includes an operation of moving marker M, and a branching operation of branching a discussion. For example, the user can reproduce a screen at an arbitrary time point on main screen MD by moving marker M on time line TL.

In addition, in the present embodiment, the user can perform a digest creation operation of creating a conference digest with use of main screen MD and sub-screen SD.

Figure 2:
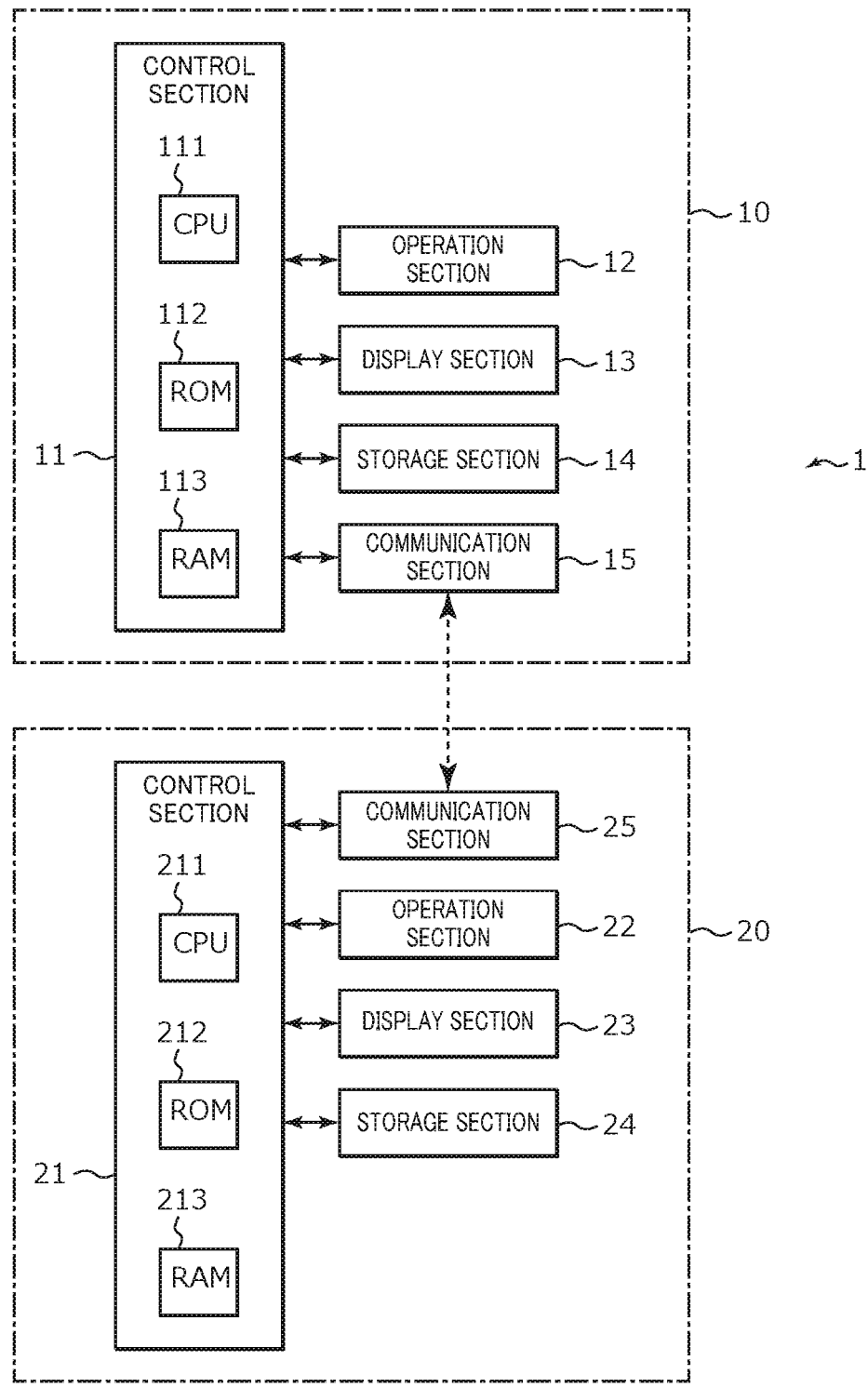
FIG. 2 is a block diagram illustrating a hardware configuration of the conference support system.

FIG. 2 illustrates an exemplary hardware configuration of conference support system 1.

As illustrated in FIG. 2, conference support apparatus 10 (electronic whiteboard) includes control section 11, operation section 12, display section 13, storage section 14, communication section 15 and the like. The blocks are electrically connected through a bus line. When control section 11 executes a conference support program described later, a conference support method of the present embodiment is achieved.

Control section 11 includes central processing unit (CPU) 111 serving as a computing/controlling apparatus, random access memory (RAM) 113 and read only memory (ROM) 112 serving as a main storage apparatus. ROM 112 stores basic setting data and a basic program called basic input output system (BIOS). CPU 111 reads out a program suited to processing details from ROM 112 or storage section 14, develops the program in RAM 113, and controls each block in cooperation with the developed program.

Operation section 12 and display section 13 are composed of a flat panel display provided with a touch panel for example. Various kinds of conventionally known devices such as liquid crystal displays, organic EL displays, and electronic paper displays having a memory performance may be adopted as the flat panel display. Operation section 12 accepts a handwriting input, an object operation or a time line operation by the user, generates information in relation with the accepted information, and outputs the generated information to control section 11. In accordance with the display control information input from control section 11, display section 13 displays various kinds of information on main screen MD and sub-screen SD. It is to be noted that input devices such as a mouse and a keyboard may be provided as operation section 12.

Storage section 14 is, for example, an auxiliary storage such as a hard disk drive (HDD), a solid state drive (SSD), and a secure digital (SD) card, and stores a conference support program, information relating to a screen, and the like.

Communication section 15 is, for example, a communication interface such as a network interface card (NIC), a modulator-demodulator (MODEM), and a universal serial bus (USB). Control section 11 transmits and receives various kinds of information to and from terminal apparatus 20 connected to a network such as a cable LAN and a wireless LAN through communication section 15. Communication section 15 may be composed of a communication interface for near field wireless communication of near field communication (NFC), Bluetooth (registered trademark) or the like.

Terminal apparatus 20 includes control section 21, operation section 22, display section 23, storage section 24, communication section 25 and the like. Configurations of the blocks are substantially similar to those of respective blocks 11 to 15 of conference support apparatus 10, and therefore descriptions thereof are omitted. When a predetermined transmission operation set in advance is performed, control section 21 of terminal apparatus 20 transmits operation information (object operation or time line operation) input from operation section 22 to conference support apparatus 10 through communication section 25. The predetermined transmission operation includes an operation of a transmission key displayed on display section 23, a flick operation on display section 23, and the like. In addition, control section 21 receives display control information sent from conference support apparatus 10 through communication section 25, and displays the information on display section 23.

Figure 3:
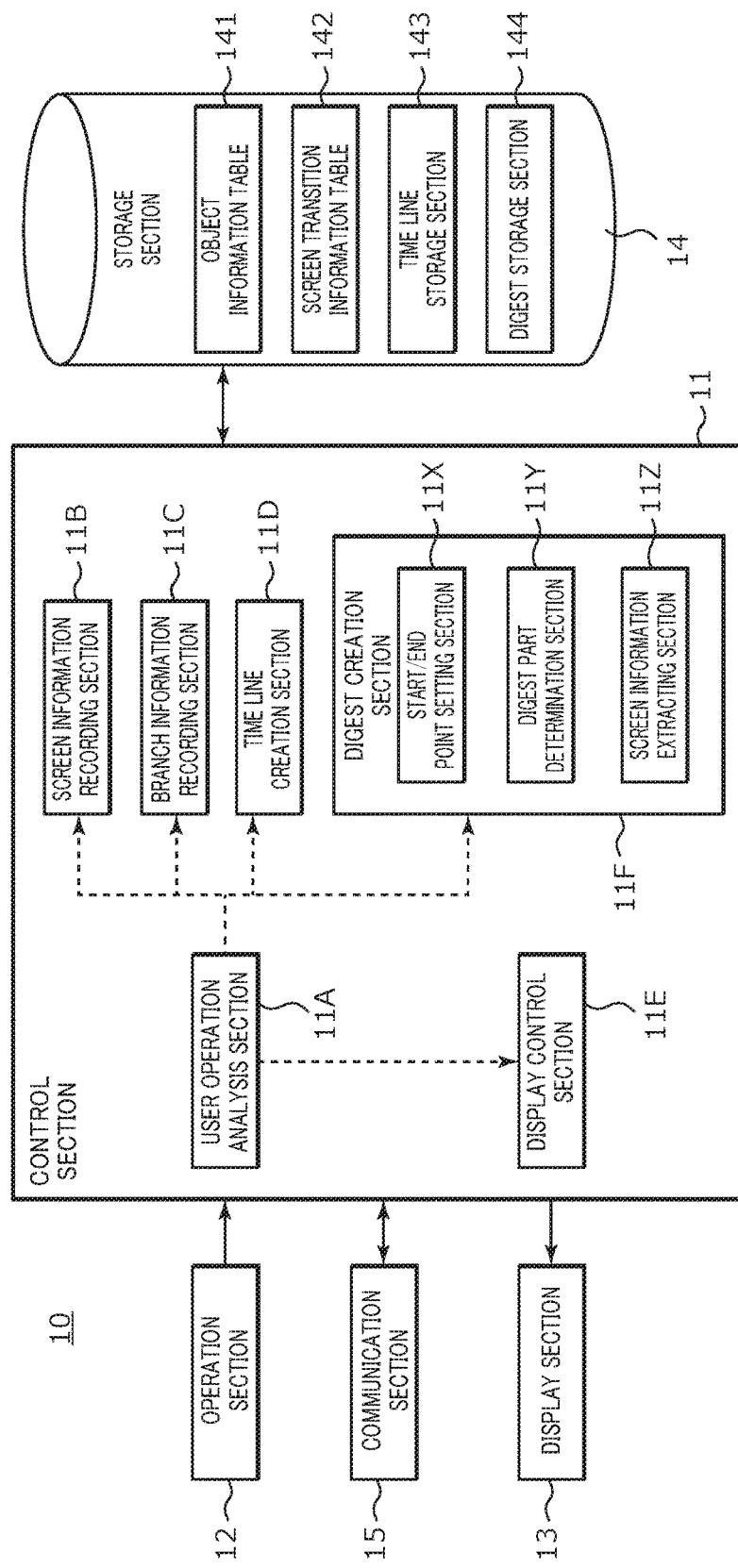
FIG. 3 is a functional block diagram illustrating a function of a control section of the conference support apparatus.

FIG. 3 is a functional block diagram illustrating a function of control section 11 of conference support apparatus 10.

As illustrated in FIG. 3, control section 11 functions as user operation analysis section 11A, screen information recording section 11B, branch information recording section 11C, time line creation section 11D, display control section 11E, and digest creation section 11F. Some or all of the functional parts may be configured by a dedicated hardware.

User operation analysis section 11A analyzes operation information input from operation section 12 or communication section 15, and specifies the operation performed by the user. On the basis of the user operation specified by user operation analysis section 11A, screen information recording section 11B, branch information recording section 11C, time line creation section 11D, display control section 11E, and digest creation section 11F execute predetermined processes preliminarily associated with respective operations.

Screen information recording section 11B records the flow of a conference (screen transition) based on the object operation by the user in storage section 14 as screen information. The screen information is information representing elements of a screen and the time when the elements are created and changed. The screen information includes object information for individually managing operations on objects or groups, and screen transition information for managing the flow of a conference in a time-series manner. The object information is stored in object information table 141 of storage section 14, and the screen transition information is stored in screen transition information table 142 of storage section 14.

On the basis of a branching operation (included in the time line operation) by the user, branch information recording section 11C records branch information in screen transition information table 142. The branching operation is an operation of generating a branch in time line TL, and is, for example, an object operation performed on main screen MD at an arbitrary time point displayed by moving marker M on time line TL, and an operation of requesting to create a branch on time line TL (for example, an operation of selecting "create branch" from a context menu that is displayed in response to long depression at an arbitrary time point on time line TL). Alternatively, a predetermined gesture operation on time line TL may be assigned as the branching operation. The branch information is used for creating a conference digest.

Time line creation section 11D refers to information of screen transition information table 142, and creates time line TL. When branch information described later is recorded in screen transition information table 142, time line TL having a branched structure is created. The information of time line TL thus created is stored in time line storage section 143 of storage section 14, for example. Time line TL may include thumbnails of representative screens (for example, screens of a conclusion and a branch point), and thumbnails of newly created objects. For example, at predetermined time intervals or in response to an object operation by the user, time line creation section 11D creates and updates time line TL. Time line TL may be displayed in a size fit to sub-screen SD by converting the time axis length on the basis of the time information, or may be displayed such that its entirety can be recognized with scrolling on sub-screen SD.

Display control section 11E generates display control information (screen data) for displaying a screen based on the user operation on display section 13, and controls display section 13 to perform a display operation based on the screen data or transmits the screen data to terminal apparatus 20 through communication section 15, thereby controlling display section 23 of terminal apparatus 20 to perform a display operation. When generating display control information, display control section 11E acquires required information from storage section 14. The display control information includes screen display control information for displaying a screen reflecting an object operation, digest display control information for displaying a conference digest created by digest creation section 11F, and time line display control information for displaying time line TL created by time line creation section 11D. That is, display control section 11E serves as a screen display control section, a digest display control section, and a time line display control section.

For example, when the user has performed a time line operation of moving marker M, display control section 11E updates the display of time line TL in sub-screen SD, and reads out the screen information (object information of objects composing the designated screen) of the screen designated by marker M from storage section 14, and then, displays the information on main screen MD.

On the basis of a digest creation operation by the user, digest creation section 11F designates the entirety of the conference or extracts a part of the conference to create a conference digest. The digest creation operation is an operation of selecting "digest creation" from a context menu that is displayed when main screen MD or sub-screen SD is pressed for a long time. By viewing a conference digest created by digest creation section 11F, the user can grasp the content of the entirety of the conference or a desired part of the conference in a short time.

To be more specific, digest creation section 11F includes start/end point setting section 11X, digest part determination section 11Y, and screen information extracting section 11Z. Start/end point setting section 11X sets the start point and the end point of the part to be used as a conference digest. The start point and the end point of a conference digest are designated by the user. The method for designating the start point and the end point is described later.

Digest part determination section 11Y determines a digest part that connects the start point and the end point set by start/end point setting section 11X. The method for determining a digest part is described later. The screen information extracting section extracts screen information on a screen included in the digest part determined by digest part determination section 11Y to create a conference digest. The conference digest information thus created (hereinafter referred to as "digest information") is stored in digest storage section 144 of storage section 14 in a discriminable fashion. In addition, when the user performs an operation of reproducing a conference digest, display control section 11E reads out digest information from storage section 14 and displays the information on display section 13.

FIG. 4 illustrates an example of object information table 141. As illustrated in FIG. 4, object information table 141 includes "object ID," "operation content," "operation time," and "meta information."

The "object ID" is identification information that is given to each object when an object or a group is newly created. The "operation content" is information representing an operation performed on an object or a group. The "operation content" of an object includes creation, movement, editing, resizing, deletion, grouping, ungrouping and the like, for example. The "operation content" of a group includes creation, movement, editing, resizing, ungrouping and the like, for example.

The "operation time" is information representing the time at which an object operation is executed. The "meta information" is detailed information of an object or a group. The "meta information" of an object includes the image information, text information, location information (coordinate) and size of the object, for example. The "meta information" of a group includes the image information of the group region, location information (coordinate), size of the group region, and object IDs of objects of the group, for example. The object ID, operation content, operation time, and meta information are stored in storage section 14 by screen information recording section 11B.

According to FIG. 4, for example, an object having an ID of "OB1" is an object which has been newly created at 14:00:00, moved at 14:00:30, resized at 14:00:50, and grouped at 14:02:00.

Figure 7:
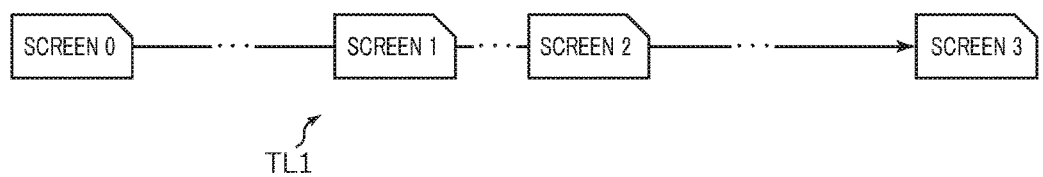
FIG. 7 illustrates a time line corresponding to the screen transition information table illustrated in FIG. 5.

FIG. 5 illustrates an example of screen transition information table 142. FIG. 5 illustrates a screen transition information table of a case where the screen is changed from screen 0 to screen 3 of the conclusion, via screen 1 and screen 2. Specifically, when a conference is proceeded as time line TL1 illustrated in FIG. 7, the screen transition information table illustrated in FIG. 5 is obtained. In other words, time line TL1 illustrated in FIG. 7 is created based on the screen transition information table illustrated in FIG. 5. The screen transition information is recorded every time when an object operation is performed. In FIG. 5, screen 0 to screen 3 are exemplified, and other screens are omitted.

Figure 8:
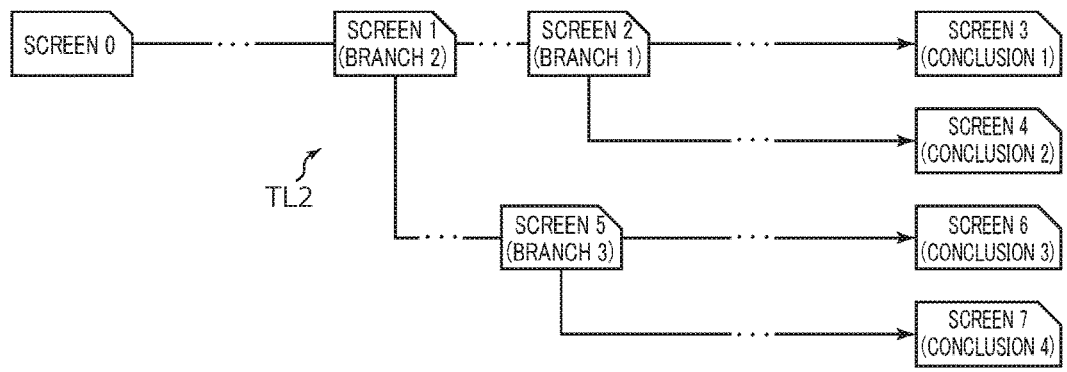
FIG. 8 illustrates a time line corresponding to the screen transition information table illustrated in FIG. 6.

FIG. 6 illustrates another exemplary screen transition information table 142. FIG. 6 illustrates a screen transition information table of a case where the screen is changed from screen 0 to screen 3 (conclusion 1) via screen 1 and screen 2, then branched at screen 2 (branch 1) to screen 4 (conclusion 2), then further branched at screen 1 (branch 2) to screen 6 (conclusion 4) via screen 5, and then still further branched at screen 5 (branch 3) to screen 7 (conclusion 4). That is, when a conference is proceeded as time line TL2 illustrated in FIG. 8, screen transition information table illustrated in FIG. 6 is obtained. In other words, time line TL2 illustrated in FIG. 8 is created based on the screen transition information table illustrated in FIG. 6.

In this manner, data is added in a time-series manner every time when an object is added or changed, and thus the data configuration is simple, and moreover, screen transition along time course can be easily grasped. Also in FIG. 6, screen 0 to screen 7 are exemplified, and other screens are omitted. In addition, the numbers "0" to "7" of screen 0 to 7 in FIGS. 5 and 6 are given for convenience of description, and in practice, every time when an object is changed or added on the screen, the number, individual serial number and the like generated based on the date and time of the operation may be given in order.

As illustrated in FIG. 5 and FIG. 6, a screen transition information table includes "screen ID," "time," "composing object," and "branch information." The "screen ID" is identification information of each screen that is given when an object operation is performed. In other words, the "screen ID" is a scene information that is provided in the object operation. The "time" is information representing the time at which an object operation is executed. The "composing object" is information representing a configuration of main screen MD at the time when an object operation is performed, and is, for example, the object ID of an object included in main screen MD or the like. The "screen ID," "time," and "composing object" are recorded in storage section 14 by screen information recording section 11B.

The branch information is identification information that is given when a branching operation is performed, and the same identification information is given to the screen on which the branching operation is performed. The branch information is recorded in storage section 14 by branch information recording section 11C.

Display control section 11E refers to screen transition information table 142 and acquires object ID of the object to be displayed. Then, display control section 11E acquires the meta information of the object specified by the acquired object ID from object information table 141, and controls main screen MD to display the information at a predetermined position.

According to FIG. 5 and FIG. 6, for example, when marker M is moved to the time point of screen 1 by a time line operation, object OB1, object OB2, and group GR1 included in screen 1 are displayed on main screen MD on the basis of the meta information thereof.

Figure 9:
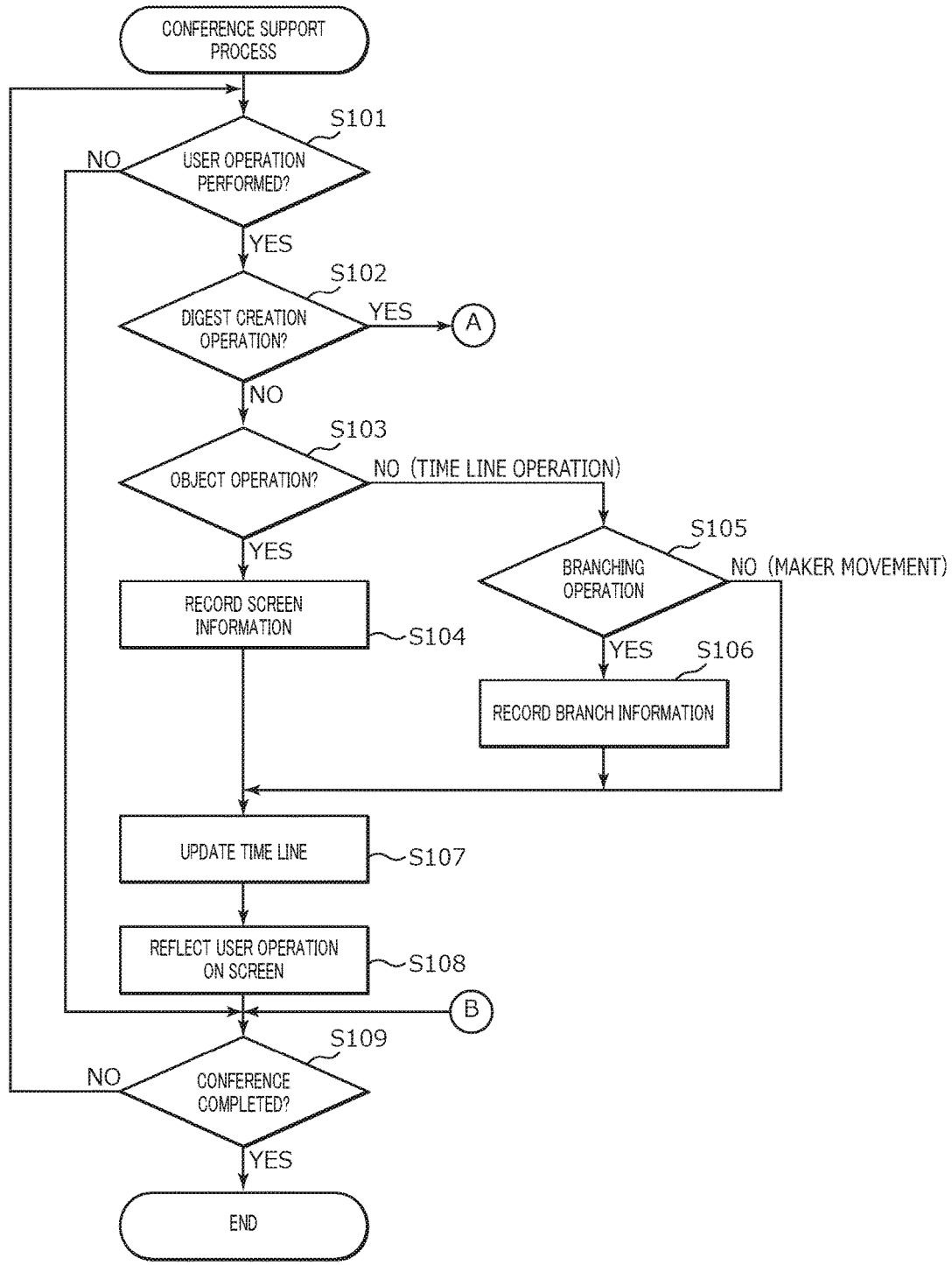
FIG. 9 is a flowchart of an exemplary conference support process.
Figure 10:
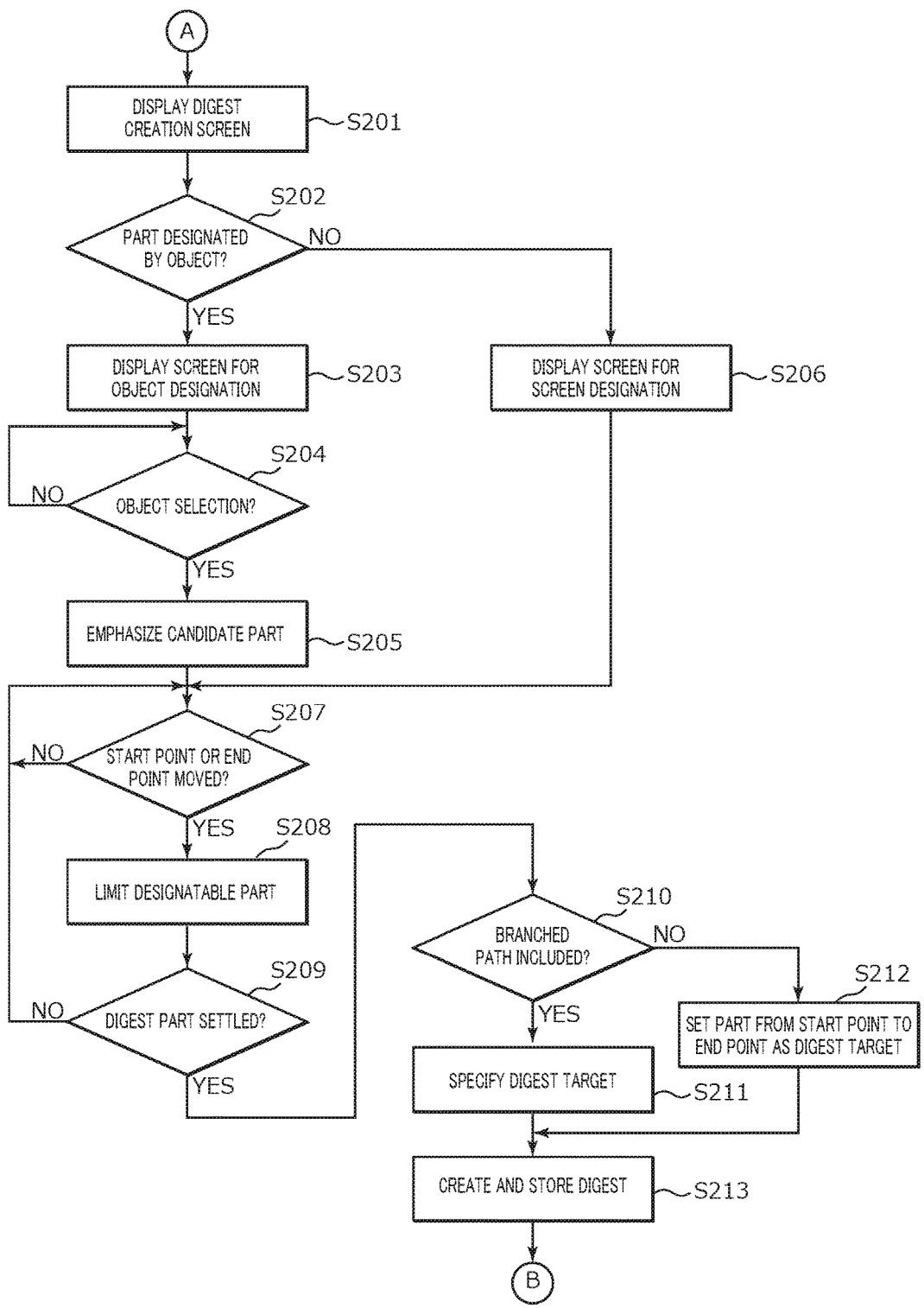
FIG. 10 is a flowchart of an exemplary digest creation process which is a part of the conference support process illustrated in FIG. 9.

FIG. 9 and FIG. 10 are flowcharts of an exemplary conference support process executed by control section 11. This process is achieved when CPU 111 executes a conference support program stored in ROM 112 upon turning on of the power of conference support apparatus 1.

At step S101, control section 11 determines whether a user operation has been performed at operation sections 12 and 22 (a process performed as user operation analysis section 11A). When a user operation has been performed ("YES" at step S101), the process is advanced to step S102. When a user operation has not been performed ("NO" at step S102), the process is advanced to step S109.

At step S102, control section 11 determines whether the user operation is a digest creation operation (a process performed as user operation analysis section 11A). When the user operation is a digest creation operation ("YES" at step S102), the process is advanced to step S201 of FIG. 10. When the user operation is not a digest creation operation ("NO" at step S102), the process is advanced to step S103.

At step S103, control section 11 determines whether the user operation is an object operation (a process performed as user operation analysis section 11A). When the user operation is an object operation ("YES" at step S103), the process is advanced to step S104. When the user operation is not an object operation, that is, when the user operation is a time line operation ("NO" at step S103), the process is advanced to step S107.

At step S104, control section 11 records screen information in object information table 141 of storage section 14 (see FIG. 4) and screen transition information table 142 (see FIGS. 5 to 6) on the basis of the object operation by the user (a process performed as screen information recording section 11B).

When it is determined at step S103 that the user operation is a time line operation, control section 11 determines whether the user operation is a branching operation at step S105 (a process performed as user operation analysis section 11A). When the user operation is a branching operation ("YES" at step S105), the process is advanced to step S106. When the user operation is not a branching operation, that is, when the user operation is a marker movement ("NO" at step S105), the process is advanced to step S107.

At step S106, control section 11 records branch information in screen transition information table 142 of storage section 14 (a process performed as branch information recording section 11C). FIG. 11 illustrates an example of screen transition information table 142 immediately after a branching operation. When a branching operation is performed by returning to the time point of screen 2 in time line TL1 illustrated in FIG. 7, the information about the screen 2 is recorded subsequently to the information about the screen 3 as illustrated in FIG. 11. In addition, branch information "B001" indicating a first branch point (branch point 1) is given to the screen information about firstly recorded screen 2 and the screen information about secondly recorded screen 2. Screen transition after the branch is recorded subsequently to the screen information about secondly recorded screen 2. In addition, when a conference is proceeded as the time line illustrated in FIG. 8, branch information "B002" representing a second branch point (branch point 2) is given to the screen information about screen 1, and branch information "B003" representing a third branch point is given to the screen information about screen 5 (see FIG. 6).

At step S107, control section 11 creates time line TL, and records the time line TL in storage section 14 (a process performed as time line creation section 11D). For example, when an object operation is performed, the time axis of time line TL is extended, and time line TL corresponding to the movement of marker M is created. In addition, for example, when a branching operation is performed, time line TL having the time axis after the branch is created.

At step S108, control section 11 reads out screen information and time line information from storage section 14, and controls display section 13 to display a screen reflecting the user operation (a process performed as display control section 11E).

At step S109, control section 11 determines whether the conference has been completed. When the conference has been completed ("YES" at step S109), the conference support process is completed. When the conference has not been completed ("NO" at step S109), the process is advanced to step S101.

When it is determined at step S102 that the user operation is a digest creation operation, control section 11 executes a digest creation process in accordance with the flowchart illustrated in FIG. 10 (a process performed as digest creation section 11F). Specifically, at step S201 of FIG. 10, control section 11 operates to display a start screen of digest creation. In the present embodiment, the digest part can be designated by screens or objects. The designation using screens is a method in which the user designates a digest part by confirming screens of arbitrary time points and depending on his or her memories. The designation using objects is a method in which digest candidate parts are presented based on the selected objects, and a digest part is designated from the digest candidate parts.

Figure 12:
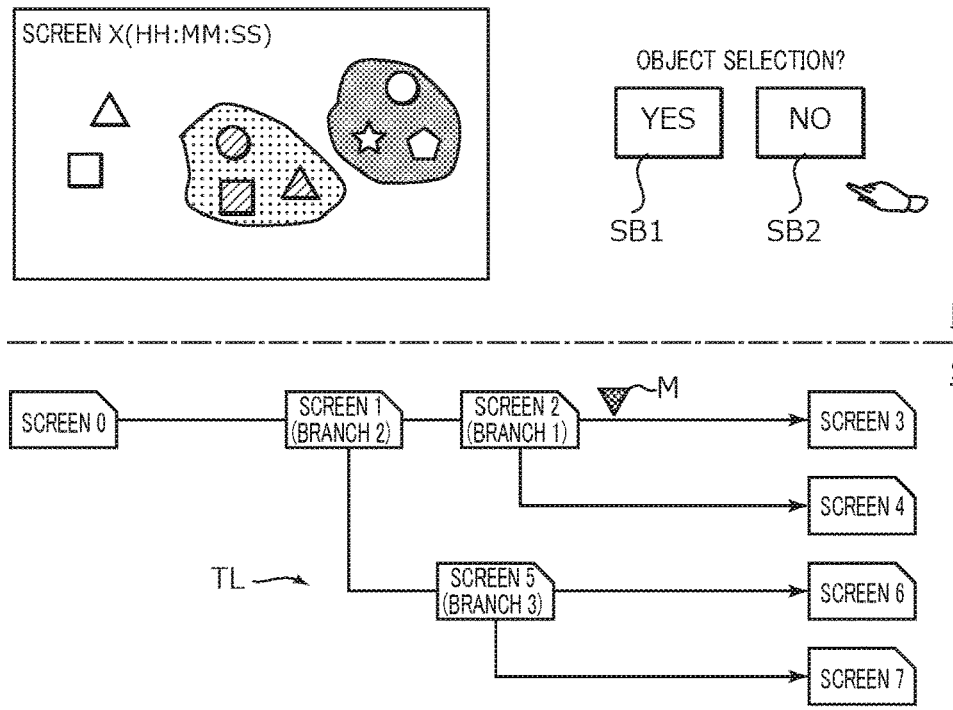
FIG. 12 illustrates an exemplary screen for selecting a method for designating a digest part.

FIG. 12 illustrates an exemplary screen for selecting the way of designating a digest part. As illustrated in FIG. 12, in main screen MD, screen X designated by marker M on time line TL is displayed, and selection buttons SB1 and SB2 for selecting whether to designate the digest part by objects are displayed. When marker M is moved on this screen, screen X changes. It is also possible to adopt a configuration in which a thumbnail of screen X is displayed at the position of marker M and screen X is displayed on main screen MD after the position of marker M is settled. The user determines the way of designating a digest part by operating selection button SB1 or selection button SB2.

At step S202, on the basis of the user operation, control section 11 determines whether designation by objects is to be performed. When the designation by objects is to be performed ("YES" at step S202), the process is advanced to step S203. When the designation by objects is not to be performed, that is, when designation by screens is to be performed ("NO" at step S202), the process is advanced to step S206. For example, when selection button SB1 of "YES" indicating that the object designation is to be performed is selected on the screen illustrated in FIG. 12, the process is advanced to step S203, and when selection button SB2 of "NO" indicating that the object designation is not to be performed (screen designation is performed) is selected on the screen illustrated in FIG. 12, the process is advanced to step S206.

Figure 13:
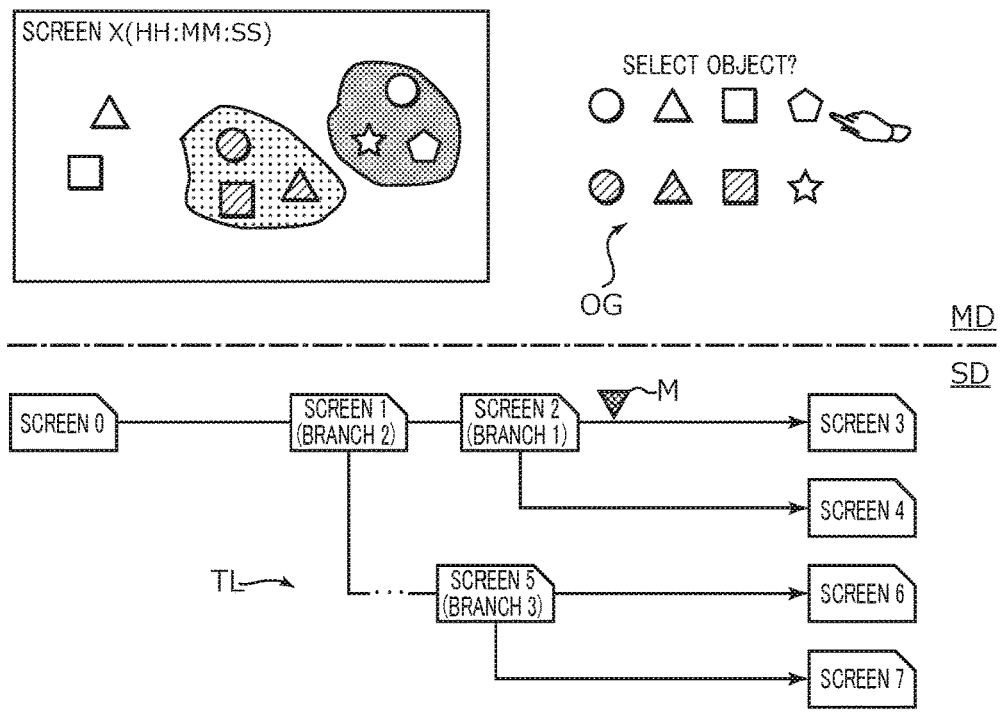
FIG. 13 illustrates an exemplary screen for object designation.

At step S203, control section 11 operates to display a screen for object designation. FIG. 13 illustrates an exemplary screen for object designation. In FIG. 13, eight kinds of objects, which are object group OG included in screen X designated by movement marker M, are displayed in a right area on screen X. When movement marker M is moved, the objects displayed on the screen change along with the change of screen X. The user selects one or more objects from object group OG.

At step S204, on the basis of the user operation, control section 11 determines whether an object selection operation has been performed. When the object selection operation has been performed, the process is advanced to step S205.

At step S205, control section 11 refers to image transition table 142 (see FIG. 6) to specify the screen including the selected object, and emphatically displays a digest candidate part on time line TL. The digest candidate part can be emphasized by changing the width or the color of the time axis line of time line TL. When the selected object changes, the digest candidate part also changes. The presentation of the digest candidate part is not limited to the emphatic display of time line TL, and may be performed by utilizing time information (text information).

Figure 14:
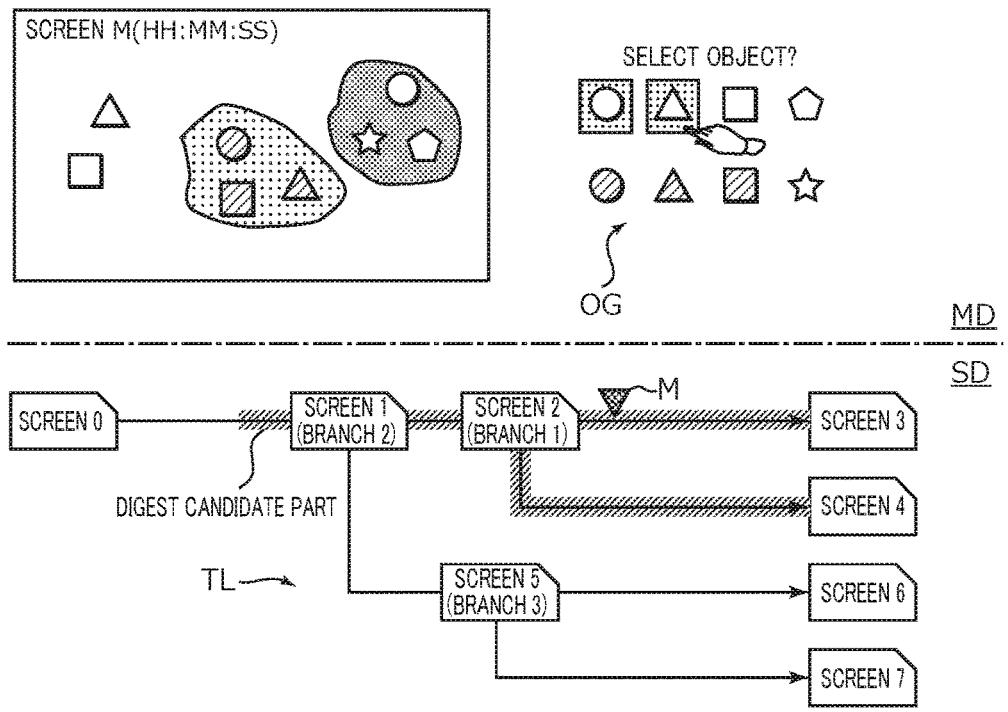
FIG. 14 illustrates an exemplary emphatic display of a digest candidate part.

FIG. 14 illustrates an exemplary emphatic display of a digest candidate part. When two objects are selected as illustrated in FIG. 14, the screens including the objects are specified and emphatic display on time line TL is performed.

As described, digest creation section 11F presents objects included in a screen at an arbitrary time point, and presents the part including an object selected by a selection operation from operation sections 12 and 22 as a digest candidate part. With this configuration, the user can visually recognize the digest candidate part including the desired conference content.

Figure 15:
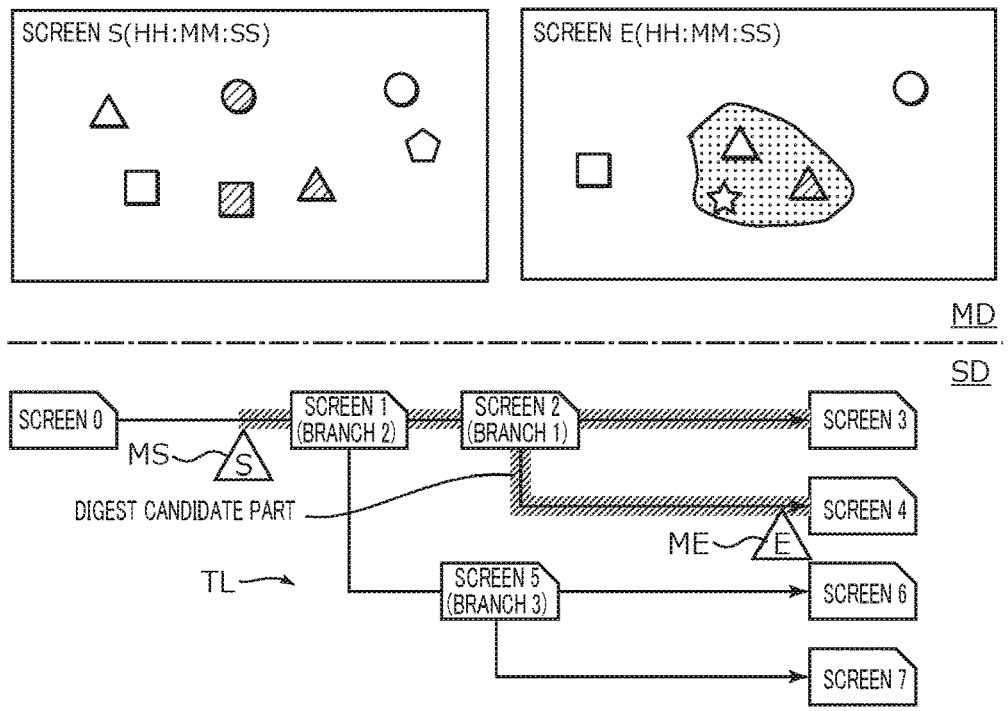
FIG. 15 illustrates an exemplary screen display at the time when a digest part is settled in a digest candidate part.

When the object selection is settled on the screen illustrated in FIG. 14, start point marker MS representing the start point of the digest part and end point marker ME representing the end point of the digest part appear on time line TL as illustrated in FIG. 15. Start point marker MS can be displayed on time line TL at a position corresponding to the screen on which any of the designated objects firstly appears, and end point marker ME can be displayed on time line TL at a position corresponding to the newest screen on which any of the designated objects exists. Alternatively, start point marker MS and end point marker ME may be displayed such that they correspond to the period in which all of the designated objects exist.

In addition, screen S corresponding to the start point and screen E corresponding to the end point are displayed on main screen MD. Start point marker MS and end point marker ME can be slid on time axis of time line TL, and can be dragged to a branched time axis. The user sets a desired digest part by moving start point marker MS and end point marker ME. Start point marker MS and end point marker ME may be controlled not to move to the region where no designated object presents, or may freely move. In the latter case, the whole area can be set as a digest part when no branch is provided.

Figure 16:
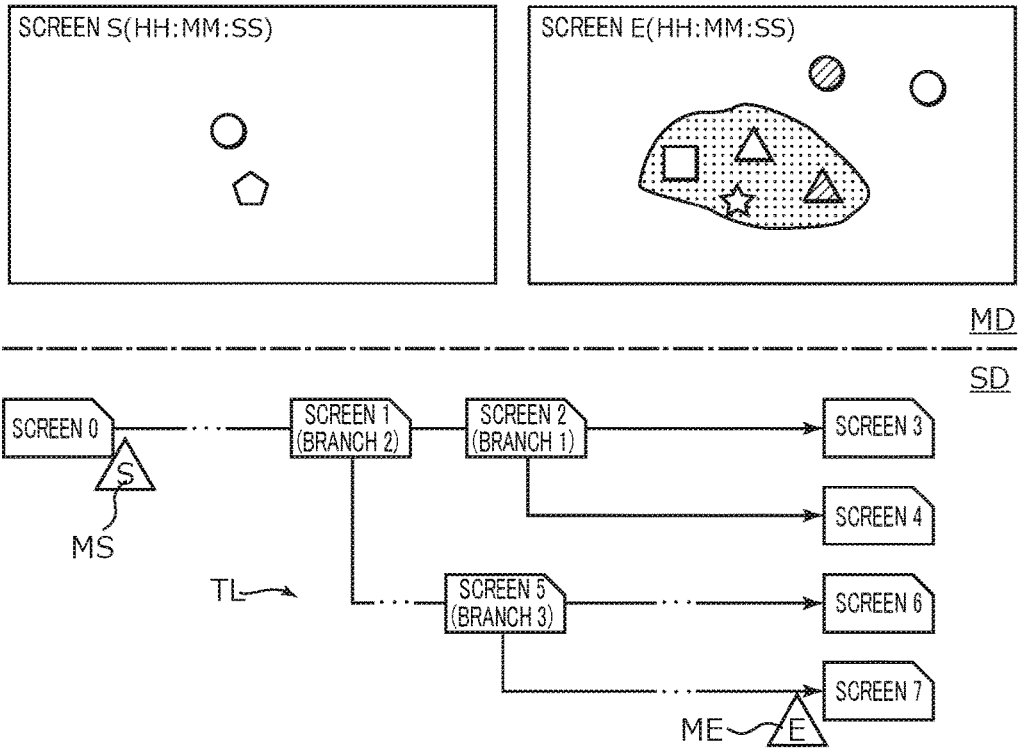
FIG. 16 illustrates an exemplary screen for screen designation.

When the digest part is to be designated by screens ("NO" at step S202), control section 11 operates to display a screen for screen designation at step S206. FIG. 16 illustrates an exemplary screen for screen designation. As illustrated in FIG. 16, start point marker MS representing the start point of the digest part and end point marker ME representing the end point of the digest part appear on time line TL, and screen S corresponding to the start point and screen E corresponding to the end point are displayed on main screen MD. In this case, the digest candidate part is not presented, and start point marker MS and end point marker ME are displayed at the start and the end, respectively, on the time axis, for example.

As a matter of course, it is possible to emphatically display the area from start point marker MS to end point marker ME. In that case, start point marker MS and end point marker ME may be displayed at any positions on time line TL. For example, the makers may be displayed at the positions of the last time, or it is also possible to display start point marker MS at a position corresponding to the screen which is created first, and display end point marker ME at a position corresponding to the screen which is created last. When no branch is provided, the whole area may be designated as a digest part.

At step 5207, control section 11 determines whether the position of the start point or the end point has been changed on the basis of the user operation. When the position of the start point or the end point has been changed ("YES" at step S207), the process is advanced to step S207. When the position of start point marker MS or end point marker ME on time line TL is changed, screen S or screen E also changes to the corresponding screen. This applies to the case where the digest candidate part is presented (see FIG. 15) as well as the case where the digest candidate part is not presented (see FIG. 16).

Figure 17:
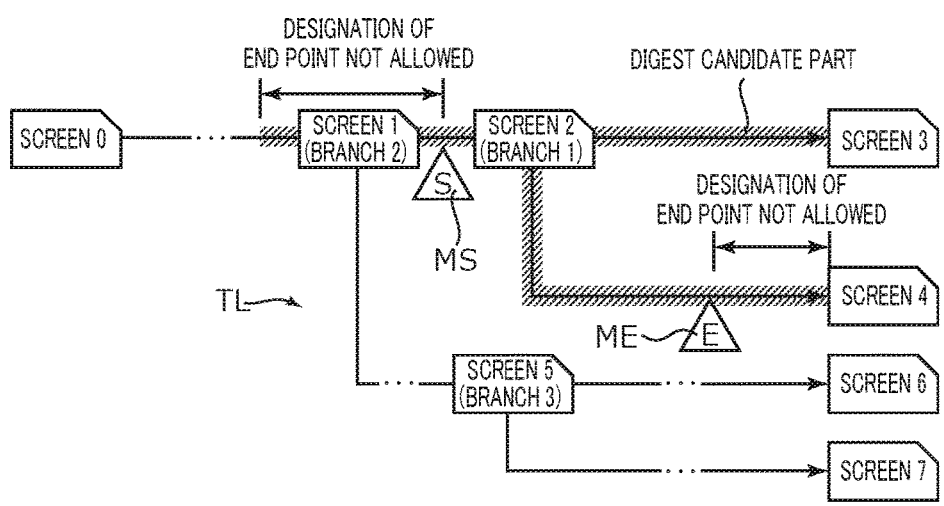
FIG. 17 illustrates an exemplary time line when the positions of a start point and an end point are changed.

At step S208, control section 11 limits the designatable part such that start point marker MS always precedes end point marker ME on the time axis. For example, when the position of start point marker MS is changed as illustrated in FIG. 17 in the case where the digest candidate part is set, the end point cannot be designated in the area between the start of the digest candidate part and start point marker MS after the movement. In addition, when position of end point marker ME is changed, the start point cannot be designated in the area between the end of the digest candidate part and end point marker ME after the movement. It is possible to adopt a configuration in which start point marker MS moves together with end point marker ME when the user tries to move end point marker ME to an area preceding start point marker MS, and a configuration in which end point marker ME moves together with start point marker MS when the user tries to move start point marker MS to an area succeeding end point marker ME.

As described, when one of the start point and the end point is designated, digest creation section 11F limits the part where the other of the start point and the end point can be designated. Thus, the user can readily set the start point and the end point of the digest part.

At step S209, on the basis of the user operation, control section 11 determines whether the digest part has been settled. For example, when a predetermined settlement operation set in advance is performed by the user, the digest part is settled. When the positions of start point marker MS and end point marker ME have not been changed from the initially set positions by the operator, the positions are considered as designated positions and thus the digest part is settled. When the digest part is settled ("YES" at step S209), the process is advanced to step S209. When the digest part is not settled ("NO" at step S209), the process is advanced to step S206.

At step S209, control section 11 determines whether a branched path is included in the settled digest part. When a branched path is included in the digest part ("YES" at step S209), the process is advanced to step S211. When a branched path is not included in the digest part ("NO" at step S209), the process is advanced to step S212.

To be more specific, control section 11 refers to screen transition information table 142 (which corresponds to information containing "branch information" stored in branch information recording section 11C as the branch management section) to determine whether a branched path is included in the digest part on the basis of the branch information associated with the screen. When a branching operation is performed, information about the screen on which the branching operation is performed is additionally stored in screen transition information table 142, and the information is associated with branch information identical to that of the previously stored screen. Accordingly, when a plurality of screens associated with identical branch information present between the screen corresponding to the start point and the screen corresponding to the end point in screen transition information table 142, the designated digest part includes a branched path (a discussion after a branch). The part sandwiched between the screens associated with the identical branch information corresponds to a discussion prior to a branch.

Figure 18:
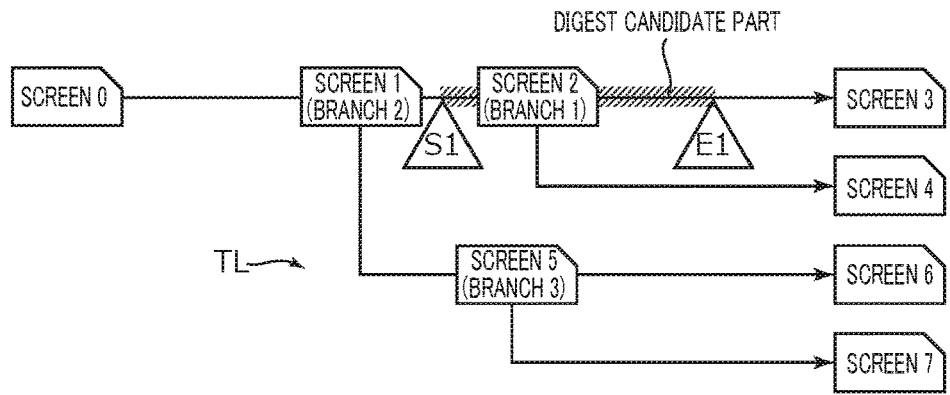
FIG. 18 illustrates an exemplary digest part set on a time line.
Figure 19:
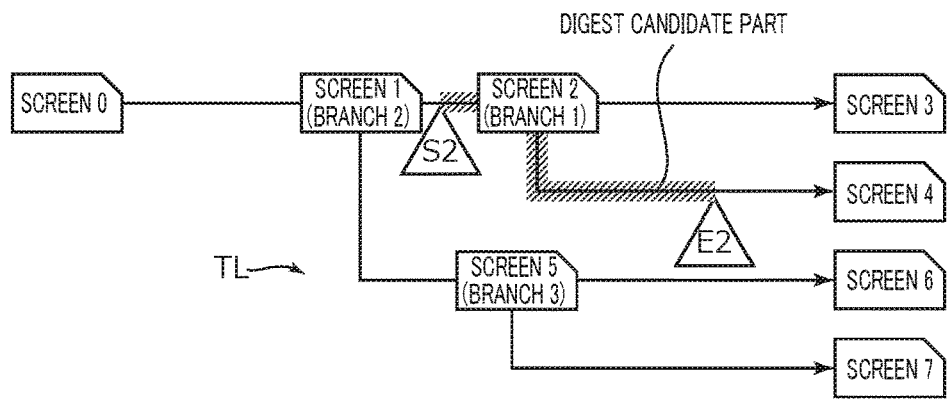
FIG. 19 illustrates another exemplary digest part set on a time line.
Figure 20:
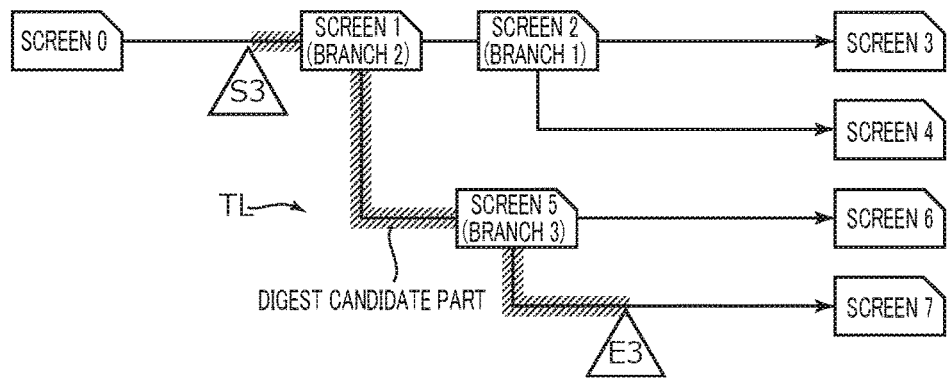
FIG. 20 illustrates another exemplary digest part set on a time line.
Figure 21:
FIG. 21 illustrates a transition table corresponding to the digest part screen of FIG. 18.
Figure 23:
FIG. 23 illustrates a transition table corresponding to the digest part screen of FIG. 20.

FIG. 18 to FIG. 20 illustrate exemplary digest parts. FIG. 21 to FIG. 23 illustrate screen transition tables of the digest parts of FIG. 18 to FIG. 21, respectively.

When a digest part is set as illustrated in FIG. 18, the screen in the range enclosed with the thick line in FIG. 21 is included between the screen corresponding to start point 51 and the screen corresponding to end point E1. In this range, a set of screens associated with identical branch information is not included. That is, a plurality of screens associated with identical branch information are not included. Accordingly, no branched path is included in this digest part.

When a digest part is set as illustrated in FIG. 19, the screen in the range enclosed with the thick line in FIG. 22 is included between the screen corresponding to start point S2 and the screen corresponding to end point E2. This range includes a set of screens associated with identical branch information (screen 2). Accordingly, a branched path is included in this digest part.

When a digest part is set as illustrated in FIG. 20, the screen in the range enclosed with the thick line in FIG. 23 is included between the screen corresponding to start point S3 and the screen corresponding to end point E3. This range includes three sets of screens associated with identical branch information (screen 1, screen 2, and screen 5). Accordingly, branched paths are included in this digest part.

At step S211, control section 11 specifies the digest target on the basis of the branch information. In the case where the digest part includes a branched path, the discussion prior to the branch is also included when screen information from the start point to the end point is extracted in a time series order. In view of this, when a branch is included between the start point and the end point, a digest part that connects the start point and the end point except for the original path of the branch subsequent to the branch point of the branch is specified, and the screen information included in the specified digest part is used as a digest target. To be more specific, in screen transition information table 142, screen information of the part obtained by excluding the part (which corresponds to the discussion prior to the branch) sandwiched between the screens associated with identical branch information from the part from the start point to the end point is used as the digest target (that is, the screen information corresponding to the digest part). For example, in the case of the digest part illustrated in FIG. 19, the shaded portions in FIG. 22 are the digest target, and in the case of the digest part illustrated in FIG. 20, the shaded portions in FIG. 23 are the digest target.

At step S212, control section 11 uses the screen information of the part from the start point to the end point as the screen information of the digest target. When the digest part includes no branched path, there is no part to be excluded, and therefore it is only necessary to extract the screen information from the start point to the end point in a time series order. For example, in the case of the digest part illustrated in FIG. 18, the shaded portions in FIG. 21 are the digest target.

At step S213, control section 11 reads out the screen information about the screen corresponding to a digest part to create a conference digest, and records the conference digest in storage section 14. The recorded conference digest is reproduced on main screen MD on the basis of a digest reproducing operation by the user, for example.

As described, in conference support system 1 including display sections 13 and 23 for displaying objects presented in a conference and operation sections 12 and 22 for operating the objects, conference support apparatus 10 manages screen transfer on the basis of the object operation at operation sections 12 and 22. Conference support apparatus 10 includes a conference management section (screen information recording section 11B, object information table 141, and screen transition information table 142), a screen display control section (display control section 11E), a branch management section (branch information recording section 11C, and a screen transition information table 142), digest creation section 11F, and a digest display control section (display control section 11E). The conference management section (screen information recording section 11B, object information table 141, and screen transition information table 142) stores screen information relating to the screen obtained by the object operation in a time-series manner every time when object operation is performed at operation sections 12 and 22 to thereby manage screen transition in the conference. The screen display control section (display control section 11E) controls display sections 13 and 23 to display screen reflecting the object operation. When a branching operation is performed at operation sections 12 and 22 to branch the discussion by returning the screen to an arbitrary time point, the branch management section (branch information recording section 11C, and a screen transition information table 142) stores branch information for discriminating a branch point in association with the screen on which the branching operation is performed to manage a branch point of the conference. When a digest creation operation including designation of the start point and the end point is performed at operation sections 12 and 22, digest creation section 11F refers to branch information to specify the screen information corresponding to the digest part that connects the start point and the end point except for the original path of the branch subsequent to the branch point of the branch when the branch is included between the start point and the end point, and creates a conference digest on the basis of the screen information corresponding to the specified digest part. The digest display control section (display control section 11E) controls display sections 13 and 23 to display a conference digest created by digest creation section 11F on the basis of a predetermined operation at operation sections 12 and 22.

When a branching operation is performed, the conference management section (screen information recording section 11B, object information table 141, and screen transition information table 142) additionally stores the screen information of the screen at which the branching operation is performed, and the branch management section (branch information recording section 11C and screen transition information table 142) gives identical branch information to the previously stored screen information and the additionally stored screen information of the screen on which the branching operation is performed, and, when a plurality of screens associated with the identical branch information are included between the screen corresponding to the start point and the screen corresponding to the end point, digest creation section 11F uses as a digest part a part from which the part sandwiched by the screens is excluded.

With conference support apparatus 10, screen information about a screen included in a digest part is appropriately extracted from a conference which is branched at an arbitrary time point and in which multiple conclusions are obtained, and a conference digest is created, with a very simple operation of designating the start point and the end point for specifying the digest part. With a highly convenient conference digest including only a required conference content, the user can readily determine a desired conference content. Consequently, utilization of screen information is facilitated, and efficiency of the conference is further improved. For example, conference support apparatus 10 is very useful for looking back the history of the discussion made in a plurality of patterns.

In addition, conference support apparatus 10 includes time line creation section 11D and a time line display control section (display control section 11E). Time line creation section 11D creates a time line indicating a flow of the conference in a visually recognizable tree structure on the basis of the screen information managed by the conference management section (screen information recording section 11B, object information table 141, and screen transition information table 142). The time line display control section (display control section 11E) controls display sections 13 and 23 to display the time line created by time line creation section 11D. The start point and the end point of a digest part are designated on a time line displayed on display sections 13 and 23. With this configuration, the user can set a digest part while visually confirming the flow of the conference including a branch.

While the invention made by the present inventor has been specifically described based on the preferred embodiments, it is not intended to limit the present invention to the above-mentioned preferred embodiments but the present invention may be further modified within the scope and spirit of the invention defined by the appended claims.

While branch points and the start point and the end point of the digest part can be designated on time line TL in the embodiment, a screen at an arbitrary time point can be designated as the branch point and the start point and the end point of the digest part by rewinding the display of main screen MD without displaying time line TL, for example.

In addition, when a digest part is designated by objects, it is possible to set the part including selected objects as a digest part, for example.

Furthermore, to create a conference digest, the volume of the voice of the speaker, the frequency of speech, it is possible to utilize the amount of the movement of the participant (the amount of object operation), the display of objects (red and thick: important, and black and thin: normal) and the like. By calculating the importance of the conference and extracting an important part on the basis of the above-mentioned information, a highly convenient conference digest can be created. In addition, an important point of the conference may be recorded during the conference such that a conference digest is created on the basis of the important point. While the created conference digests can be reproduced on the display section of the conference support apparatus, the created conference digests may also be transmitted to the display section of the terminal apparatus as display data so as to be reproduced on the display section of the terminal apparatus, or may be stored in a recording medium and so as to be distributed to persons concerned.

While control section 11 of conference support apparatus 10 executes the conference support program to achieve the conference support process in the embodiment, the conference support process may also be achieved with use of a hardware circuit. The conference support program may be stored in a computer-readable storage medium such as a magnetic disc, an optical disk, and a flash memory so as to be provided to an apparatus (for example, a personal computer) which can be used as the conference support apparatus. Alternatively, the conference support program may be provided by downloading through communication lines such as the Internet.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

Although embodiments of the present invention has been described and illustrated in detail, it is clearly understood that the same is by way of illustrated and example only and is not to be taken by way of limitation, the scope of the present invention being interpreted by terms of the appended claims.

What is claimed is:

1. A conference support apparatus adaptable for a conference support system, the conference support system comprising a display that displays an object and an operator interface that accepts an operation of an operator for the object displayed on the display and generates a first signal corresponding to the operation of the object accepted by the operator interface, the conference support apparatus comprising:
    a controller that receives the first signal from the operator interface and transmits second signal to the display; and
    a storage that stores, in a time-series manner, screen information relating to a screen produced in the operation of the object accepted by the operator interface, and stores branch information designating a branch point in association with a screen in which the operator interface accepts an operation of creating the branch point in a discussion represented with the screen information by setting the screen back to an arbitrary previous time point, wherein
    the operator interface is configured to accept an operation for creating a conference digest, the operation for creating a conference digest including a designation of a start point and a designation of an end point of the conference digest, and
    based upon the accepted operation for creating a conference digest, the controller (i) refers to information including the branch information stored in the storage, (ii) specifies screen information corresponding to a period of the conference digest, wherein the period of the conference digest is defined by the start point and the end point designated in the operation for creating a conference digest and the specified screen information includes screen information of screens between the start point and the end point which is different from and does not include screen information related to a residual path subsequent to the branch point, and (iii) creates the conference digest in accordance with the specified screen information.

2. The conference support apparatus according to claim 1, wherein the controller
    controls the storage to additionally store, subsequent to the screen information previously stored in the storage, screen information of a screen in which the operation of creating the branch point is accepted,
    provides identical branch information to both of the additionally stored screen data and a previously stored screen data of the screen in which the operation of creating the branch point is accepted, and
    specifies the screen information corresponding to the period of conference digest, when a plurality of screens associated with identical branch information are included in a period between a screen corresponding to the start point and a screen corresponding to the end point, by excluding screen information of a part intervening between the screens associated with the identical branch information.

3. The conference support apparatus according to claim 1, wherein the controller
    creates a time line indicating a flow of a conference in a visually recognizable tree structure on a basis of the screen information stored in the storage,
    controls the display to display the created time line, and
    promotes the operator to designate the start point and the end point on the time line displayed on the display.

4. The conference support apparatus according to claim 1, wherein the controller restricts to designate one of the start point and the end point in a specific part while the other of the start point and the end point is designated.

5. The conference support apparatus according to claim 1, wherein the controller indicates an object included in a screen at an arbitrary time point, and presents a part including an object selected by an operation of selecting the object as a candidate part of the conference digest.

6. The conference support apparatus according to claim 1 further comprising the display.

7. The conference support apparatus according to claim 1 further comprising the operator interface.

8. A conference support system comprising:
    the conference support apparatus according to claim 1; and
    a terminal comprising at least one of the display and the operator interface, and communicatively connected to the conference support apparatus.

9. A conference support method adaptable for a conference support system, the conference support system comprising a display that displays an object and an operator interface that accepts an operation of an operator for the object displayed on the display and generates a first signal corresponding to the operation of the object accepted by the operator interface, the method comprising:
    managing-screen transition in a conference by storing, in a time-series manner, screen information in a storage, wherein the screen information relating to a screen produced in the operation of the object accepted by the operator interface;
    managing a branch point in the conference by storing branch information in the storage, wherein the branch information designates the branch point in association with a screen in which the operator interface accepts an operation of creating the branch point in a discussion represented with the screen information by setting the screen back to an arbitrary previous time point;

accepting an operation for creating a conference digest including a designation of a start point and a designation of an end point of the conference digest, and based upon the accepted operation for creating a conference digest, (i) referring to information including the branch information stored in the storage, (ii) specifying screen information corresponding to a period of the conference digest, wherein the period of the conference digest is defined by the start point and the end point designated in the operation for creating a conference digest and the specified screen information includes screen information of screens between the stat point and the end point, which is different from and does not include screen information related to a residual path subsequent to the branch point, and (iii) creating the conference digest in accordance with the specified screen information.

10. The method according to claim 9 further comprising: when the branching operation is performed, additionally storing screen information of a screen in which the operator interface accepts the operation of creating the branch point subsequent to the screen information previously stored in the storage;

providing identical branch information to both of the additionally stored screen information and a previously stored screen information of the screen in which the operator interface accepts the operation of creating the branch point; and specifying the screen information corresponding to the period of the conference digest, when a plurality of screens associated with identical branch information are included in a period between a screen corresponding to the start point and a screen corresponding to the end point, by excluding screen information of a part intervening between the screens associated with the identical branch information.

11. The method according to claim 9 further comprising: creating a time line indicating a flow of a conference in a visually recognizable tree structure on a basis of the screen information stored in the storage;

controlling the display to display the created time line; and receiving the start point and the end point designated by the operator on the time line displayed on the display.

12. The method according to claim 9 further comprising: restricting to designate one of the start point and the end point in a specific part while the other of the start point and the end point is designated.

13. The method according to claim 9 further comprising: indicating an object included in a screen at an arbitrary time point; and presenting a part including an object selected by an operation of selecting the object as a candidate part of the conference digest.

14. A non-transitory computer-readable recording medium storing a conference support program configured to cause a computer of a conference support apparatus to execute processing, the computer being intended for use in a conference support system comprising a display that displays an object and an operator interface that accepts the operation of an operator for the object displayed on the display and generates a first signal corresponding to the operation of the object accepted by the operator interface, the processing comprising:

managing screen transition in a conference by storing, in a time-series manner, screen information in a storage, wherein the screen information relates to a screen produced in the operation of the object accepted by the operator interface;

managing a branch point in the conference by storing branch information in the storage, wherein the branch information designates the branch point in association with a screen in which the operator interface accepts an operation of creating the branch point in a discussion represented with the screen information by setting the screen back to an arbitrary previous time point;

accepting an operation for creating a conference digest, the operation for creating a conference digest including a designation of a start point and a designation of an end point of the conference digest; and based upon the accepted operation for creating a conference digest, (i) referring to information including the branch information stored in the storage, (ii) specifying screen information corresponding to a period of the conference digest, wherein the period of the conference digest is defined by the start point and the end point designated in the operation for creating a conference digest and the specified screen information includes screen information of screens between the start point and the end point which is different from and does not include screen information related to a residual path subsequent to the branch point, and (iii) creating the conference digest in accordance with the specified screen information.

15. The non-transitory computer-readable recording medium according to claim 14, wherein the processing further comprises: when the branching operation is performed, additionally storing screen information of a screen in which the operator interface accepts the operation of creating the branch point subsequent to the screen information previously stored in the storage;

providing identical branch information to the additionally stored screen information and a previously stored screen information of the screen in which the operator interface accepts the operation of creating the branch point; and specifying screen information corresponding to the period of the conference digest, when a plurality of screens associated with identical branch information are included in a period between a screen corresponding to the start point and a screen corresponding to the end point, by excluding screen information of a part intervening between the screens associated with the identical branch information.

16. The non-transitory computer-readable recording medium according to claim 14, wherein the processing further comprises:

creating a time line indicating a flow of a conference in a visually recognizable tree structure on a basis of the screen information stored in a time-series manner;

controlling the display to display the created time line; and allowing the start point and the end point to be designated on the time line displayed on the display.

17. The non-transitory computer-readable recording medium according to claim 14, wherein the processing further comprises: restricting to designate one of the start point and the end point in a specific part while the other of the start point and the end point is designated.

18. The non-transitory computer-readable recording medium according to claim 14, wherein the processing further comprises:
- indicating an object included in a screen at an arbitrary time point; and
- presenting a part including an object selected by an operation of selecting the object as a candidate part of the conference digest.

* * * * *